(12) United States Patent
Ogawa

(10) Patent No.: US 9,162,686 B2
(45) Date of Patent: Oct. 20, 2015

(54) DRIVE SUPPORT DEVICE AND DRIVE SUPPORT METHOD

(75) Inventor: Yuki Ogawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/240,594

(22) PCT Filed: Aug. 22, 2012

(86) PCT No.: PCT/IB2012/001615
§ 371 (c)(1),
(2), (4) Date: Feb. 24, 2014

(87) PCT Pub. No.: WO2013/027111
PCT Pub. Date: Feb. 28, 2013

(65) Prior Publication Data
US 2014/0222244 A1   Aug. 7, 2014

(30) Foreign Application Priority Data

Aug. 24, 2011 (JP) .................................. 2011-183086

(51) Int. Cl.
*B60W 50/14* (2012.01)
*G01S 13/72* (2006.01)
(Continued)

(52) U.S. Cl.
CPC .............. *B60W 50/14* (2013.01); *B60K 37/02* (2013.01); *B60W 30/18154* (2013.01); *B60W 50/0097* (2013.01); *G01D 7/04* (2013.01); *G01P 1/103* (2013.01); *G08G 1/08* (2013.01); *G08G 1/09623* (2013.01); *G08G 1/09626* (2013.01); *G08G 1/09675* (2013.01); *G08G 1/096716* (2013.01);

(58) Field of Classification Search
CPC ................. G08G 1/08; G08G 1/09675; G01S 2013/9353; G01S 2013/9321; G01S 2013/935; G01S 13/723; G01C 21/3697
See application file for complete search history.

(56) References Cited

U.S. PATENT DOCUMENTS

2003/0055596 A1* 3/2003 Studt et al. ..................... 702/150
2010/0004839 A1* 1/2010 Yokoyama et al. .............. 701/70
(Continued)

FOREIGN PATENT DOCUMENTS

DE    10 2007 002 499         7/2008
DE       102007002499 A1 *    7/2008
(Continued)

OTHER PUBLICATIONS

International Search Report Issued Feb. 13, 2013 in PCT/1812/001615 Filed Aug. 22, 2012.

*Primary Examiner* — Calvin Cheung
*Assistant Examiner* — Thomas Ingram
(74) *Attorney, Agent, or Firm* — Oblon, McClelland, Maier & Neustadt, L.L.P.

(57) ABSTRACT

A drive support device that supports driving operation of a vehicle, includes: a vehicle speed sensor that detects a current vehicle speed of the vehicle; a target vehicle speed control unit that calculates a reference target vehicle speed range of the vehicle, that sets an indication upper limit speed on the basis of the current vehicle speed detected by the vehicle speed sensor, and determines a target vehicle speed range that is a speed range lower than or equal to the indication upper limit speed on the basis of the reference target vehicle speed range; and a target vehicle speed indicating unit that indicates the target vehicle speed range determined by the target vehicle speed control unit.

18 Claims, 6 Drawing Sheets

(51) Int. Cl.
*G01C 21/36* (2006.01)
*G08G 1/08* (2006.01)
*G08G 1/00* (2006.01)
*B60K 37/02* (2006.01)
*G01P 1/10* (2006.01)
*G01D 7/04* (2006.01)
*G08G 1/0962* (2006.01)
*G08G 1/0967* (2006.01)
*B60W 50/00* (2006.01)
*B60W 30/18* (2012.01)
*G01S 13/93* (2006.01)
*B60W 30/14* (2006.01)

(52) U.S. Cl.
CPC .... *G08G 1/096725* (2013.01); *G08G 1/096783* (2013.01); *B60W 30/143* (2013.01); *B60W 2050/146* (2013.01); *B60W 2550/22* (2013.01); *B60W 2550/30* (2013.01); *B60W 2550/402* (2013.01); *G01C 21/3697* (2013.01); *G01S 13/723* (2013.01); *G01S 2013/935* (2013.01); *G01S 2013/9321* (2013.01); *G01S 2013/9353* (2013.01); *Y02T 10/84* (2013.01)

(56) References Cited

U.S. PATENT DOCUMENTS

| | | | | |
|---|---|---|---|---|
| 2010/0253542 | A1* | 10/2010 | Seder et al. | 340/932.2 |
| 2011/0018701 | A1* | 1/2011 | Mizuno | 340/438 |
| 2011/0260886 | A1* | 10/2011 | Nagura et al. | 340/905 |
| 2012/0161982 | A1* | 6/2012 | Musachio | 340/932 |
| 2013/0245945 | A1* | 9/2013 | Morita et al. | 701/533 |
| 2013/0289874 | A1* | 10/2013 | Taguchi | 701/533 |

FOREIGN PATENT DOCUMENTS

| | | |
|---|---|---|
| DE | 10 2009 048 285 | 4/2010 |
| JP | 8 329384 | 12/1996 |
| JP | 2008 8782 | 1/2008 |
| JP | 2008 296798 | 12/2008 |
| JP | 2009 289007 | 12/2009 |
| JP | 2010 191518 | 9/2010 |
| JP | 2010 257108 | 11/2010 |
| JP | 2013 45305 | 3/2013 |

* cited by examiner

DRIVE SUPPORT DEVICE AND DRIVE SUPPORT METHOD

BACKGROUND OF THE INVENTION

1. Field of the Invention

The invention relates to a drive support device and a drive support method.

2. Description of Related Art

In recent years, some of vehicles, such as automobiles; are equipped with a drive support device that supports driver's driving operation. For example, Japanese Patent Application Publication No. 2010-191518 (JP 2010-191518 A) describes a drive support device that executes drive support so that a vehicle is able to appropriately cross an intersection on the basis of a travelling state of the vehicle and a state of a traffic signal. The drive support device determines whether a host vehicle is able to cross a signalized intersection ahead of the host vehicle on a green light when the host vehicle is guided to accelerate (depress an accelerator pedal). When it is determined that the host vehicle is able to cross the signalized intersection ahead of the host vehicle on a green light when the host vehicle is guided to accelerate, the drive support device executes acceleration guiding function through an accelerator indicator to prompt a driver to accelerate in a section before the signalized intersection. When it is determined that the host vehicle is not able to cross the signalized intersection ahead of the host vehicle on a green light even when the host vehicle is guided to accelerate, the drive support device executes red light running prevention function through an alarm to prompt the driver to decelerate or stop in the section before the signalized intersection.

In addition, Japanese Patent Application Publication No. 2009-289007 (JP 2009-289007 A) describes a vehicle travelling speed indication method that compares an actual travelling speed of a vehicle with a recommended travelling speed or corrected recommended travelling speed that serves as a reference value fixedly indicated on a display screen and that indicates the actual travelling speed of the vehicle as a relative value with respect to the reference value.

The device described in JP 2010-191518 A or the method described in JP 2009-289007 A is able to notify the driver of a travelling condition in which the vehicle is able to cross a traffic signal by indicating a guide to prompt acceleration or indicating a recommended travelling speed. However, in the device described in JP 2010-191518 A or the method described in JP 2009-289007 A, an indicated target travelling speed or accelerating instructions may be significantly different in condition from a present travelling state or a target acceleration or travelling speed, and it may be required to drive the vehicle under a strict condition in order to perform travelling that satisfies the condition. In this way, when there is a possibility that the driver is guided to drive the vehicle under a strict condition, the driver may feel psychological burden from indicated support information.

SUMMARY OF THE INVENTION

The invention provides a drive support device and drive support method that are able to appropriately support driving operation while reducing a burden on a driver.

A first aspect of the invention provides a drive support device that supports driving operation of a vehicle. The drive support device includes: a vehicle speed sensor that detects a current vehicle speed of the vehicle; a target vehicle speed control unit that calculates a reference target vehicle speed range of the vehicle, that sets an indication upper limit speed on the basis of the current vehicle speed detected by the vehicle speed sensor, and determines a target vehicle speed range that is a speed range lower than or equal to the indication upper limit speed on the basis of the reference target vehicle speed range; and a target vehicle speed indicating unit that indicates the target vehicle speed range determined by the target vehicle speed control unit.

Here, when part of the calculated reference target vehicle speed range exceeds the indication upper limit speed, the target vehicle speed control unit may set an upper limit value of the target vehicle speed range to the indication upper limit speed.

In addition, when a whole of the reference target vehicle speed range exceeds the indication upper limit speed, the target vehicle speed control unit may set the target vehicle speed range to a speed range including 0 km/h.

In addition, the target vehicle speed control unit may set the indication upper limit speed to a speed higher by a set speed than the current vehicle speed.

In addition, the target vehicle speed control unit may set the indication upper limit speed to the current vehicle speed.

In addition, the drive support device may further include an information acquisition unit that acquires a limit vehicle speed of a road on which the vehicle is travelling, wherein the target vehicle speed control unit may set the indication upper limit speed to a speed lower than or equal to the limit vehicle speed acquired by the information acquisition unit.

In addition, a second aspect of the invention provides a drive support device that supports driving operation of a vehicle. The drive support device includes: an information acquisition unit that acquires a limit vehicle speed of a road on which the vehicle is travelling; a target vehicle speed control unit that calculates a reference target vehicle speed range of the vehicle, that sets an indication upper limit speed on the basis of the limit vehicle speed acquired by the information acquisition unit, and determines a target vehicle speed range that is a speed range lower than or equal to the indication upper limit speed on the basis of the reference target vehicle speed range; and a target vehicle speed indicating unit that indicates the target vehicle speed range determined by the target vehicle speed control unit.

In addition, when a difference in speed between an upper limit and lower limit of the reference target vehicle speed is smaller than or equal to a predetermined value, the target vehicle speed control unit may not indicate the target vehicle speed range on the target vehicle speed indicating unit.

In addition, the drive support device may further include: an infrastructure communication unit that acquires information about a signal cycle that is a cycle at which indication of a traffic signal arranged in a travelling direction of the vehicle changes; and a position calculation unit that calculates relative positional information between the vehicle and the traffic signal, wherein the target vehicle speed control unit may calculate a speed range, in which the vehicle is able to pass through a traffic signal point at which the traffic signal is arranged while the traffic signal is in a passage allowing indication state, as the reference target vehicle speed range on the basis of the relative positional information between the vehicle and the traffic signal point, calculated by the position calculation unit, and the information about the signal cycle, acquired by the infrastructure communication unit.

A third aspect of the invention provides a drive support method that supports driving operation of a vehicle. The drive support method includes: detecting a current vehicle speed of the vehicle; calculating a reference target vehicle speed range of the vehicle; setting an indication upper limit speed on the basis of the detected current vehicle speed; determining a target vehicle speed range that is a speed range lower than or equal to the indication upper limit speed on the basis of the reference target vehicle speed range; and indicating the determined target vehicle speed range.

In addition, a fourth aspect of the invention provides a drive support method that supports driving operation of a vehicle. The drive support method includes: acquiring a limit vehicle speed of a road on which the vehicle is travelling; calculating a reference target vehicle speed range of the vehicle; setting an indication upper limit speed on the basis of the acquired limit vehicle speed; determining a target vehicle speed range that is a speed range lower than or equal to the indication upper limit speed on the basis of the reference target vehicle speed range; and indicating the determined target vehicle speed range.

With the drive support device and drive support method according to the aspects of the invention, it is possible to appropriately support driving operation while reducing a burden on a driver.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a drive support device according to an embodiment of the invention will be described in detail with reference to the accompanying drawings. Note that the embodiment does not intend to limit the scope of the invention. In addition, component elements in the following embodiment also include ones that are easily conceived of by persons skilled in the art or substantially equivalent ones.

Figure 1:
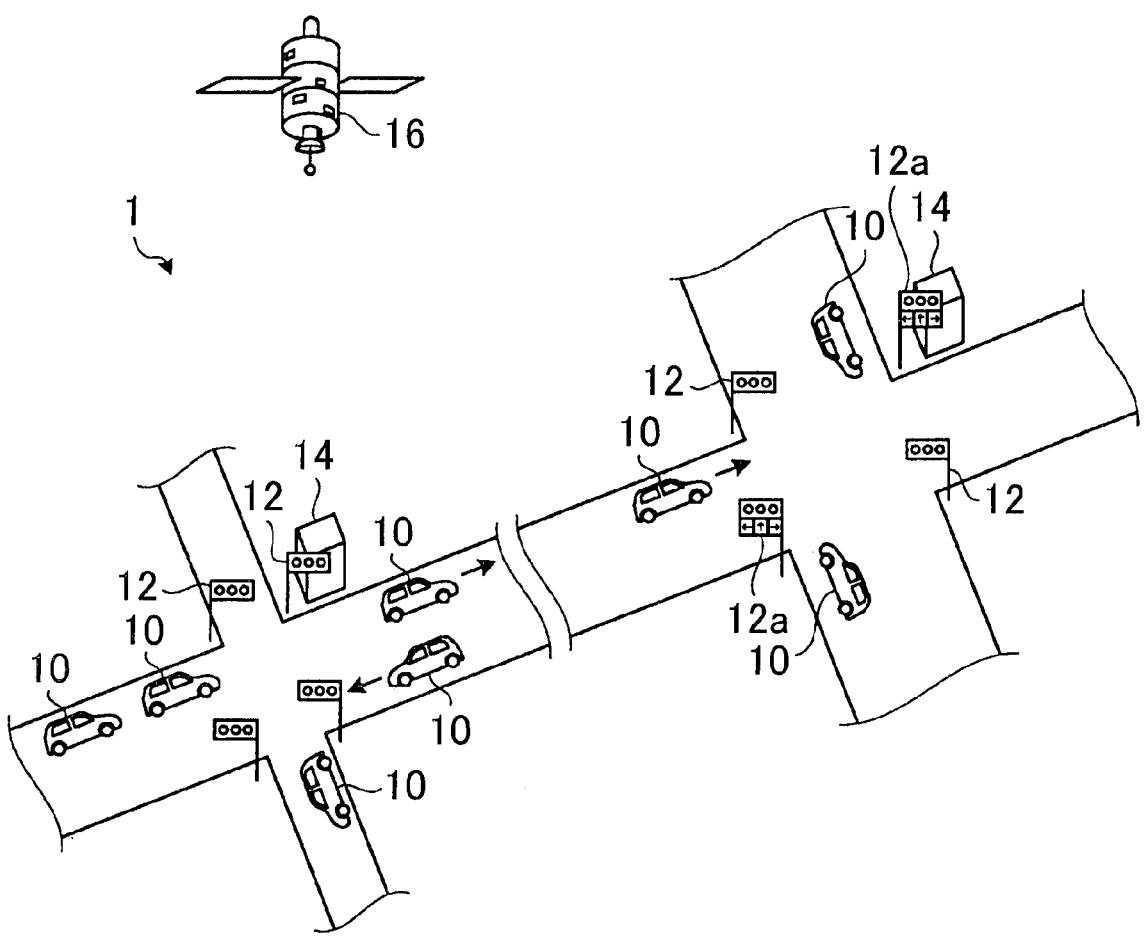
FIG. 1 is a view that illustrates an example of a drive support system according to an embodiment.
Figure 2:
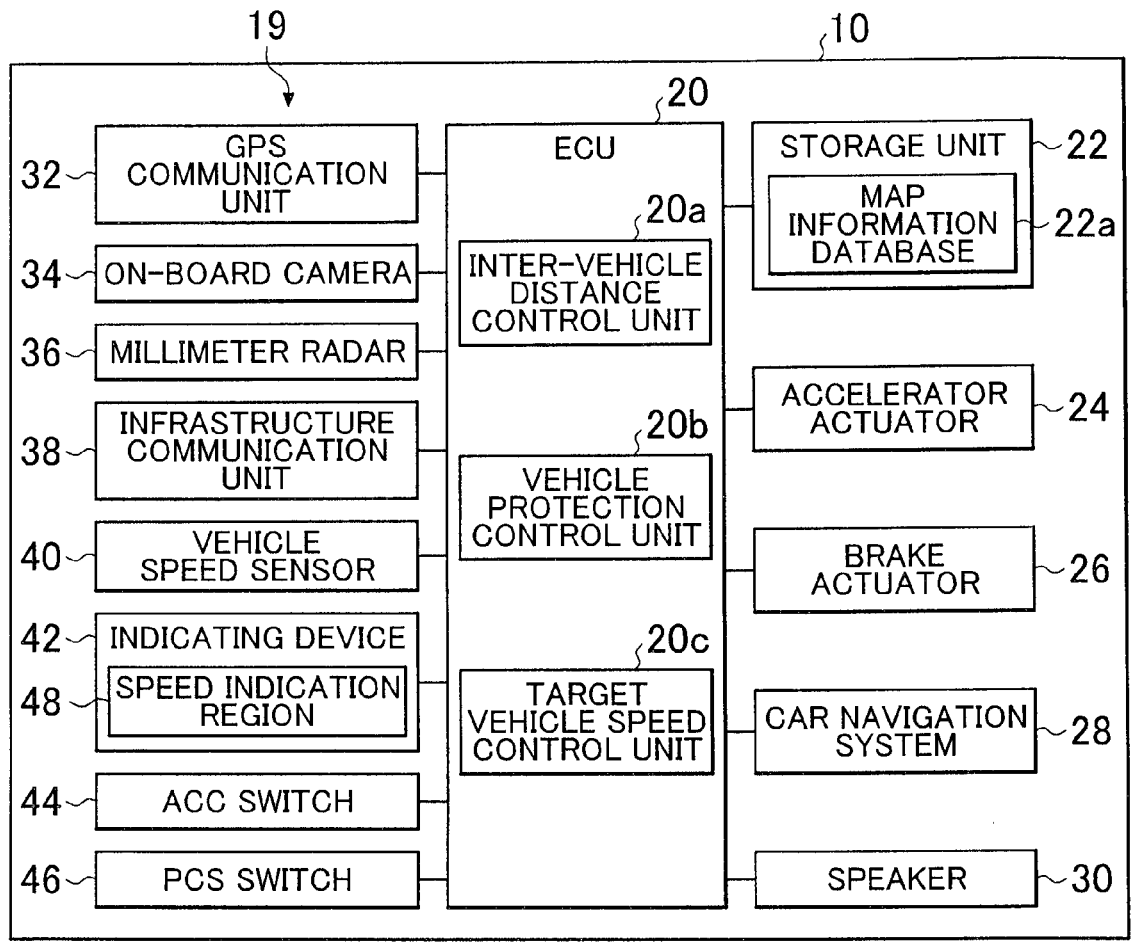
FIG. 2 is a block diagram that shows the schematic configuration of each vehicle equipped with a drive support device according to the embodiment.
Figure 3:
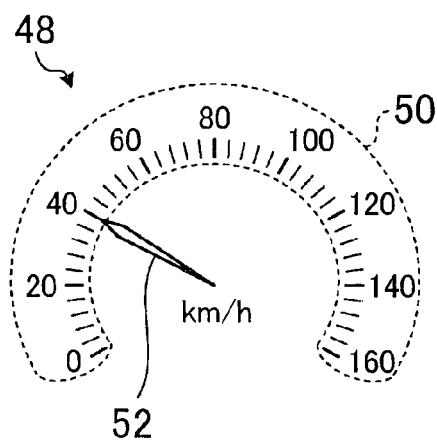
FIG. 3 is a schematic view that shows an example of a speed indication region of an indicating device.

The embodiment will be described with reference to FIG. 1 to FIG. 6. The present embodiment relates to a drive support system that includes vehicles each equipped with a drive support device. First, the configuration of the drive support system that includes the vehicles each equipped with the drive support device will be described with reference to FIG. 1 to FIG. 3. FIG. 1 is a view that illustrates an example of the drive support system according to the present embodiment. FIG. 2 is a block diagram that shows the schematic configuration of each vehicle equipped with the drive support device according to the embodiment. FIG. 3 is a schematic view that shows an example of a speed indication region of an indicating device.

The drive support system 1 shown in FIG. 1 includes a plurality of vehicles 10, a plurality of traffic signals 12 and 12a, a plurality of infrastructure information transmission devices 14 and GPS satellites 16. The drive support system 1 is a system that supports driver's driving operation on the basis of information obtained as follows. Among the plurality of vehicles 10 each equipped with the drive support device 19, one of the vehicles 10 detects a relationship with another one of the vehicles 10 or acquires the information from the infrastructure information transmission devices 14 or the GPS satellites 16.

Each of the vehicles 10 is a vehicle that is able to travel on a road and is, for example, an automobile, an autotruck, or the like. Each vehicle 10 is able to travel on a road on which the traffic signals 12 and 12a are arranged. The configuration of each vehicle 10 will be described later.

Each of the traffic signals 12 and 12a is a lighting system that is arranged at an intersection. Each of the traffic signals 12 includes three green, yellow and red lighting units. In addition, each of the traffic signals 12a includes a lighting unit (arrow lamp device) that indicates an arrow in addition to three green, yellow and red lighting units. The traffic signal 12 or 12a is arranged on each side of travelling directions of vehicles on the road. Each traffic signal 12 selects the lighting unit that emits light among the three green, yellow and red lighting units to indicate whether the vehicle 10 is allowed to travel in the travelling direction of the vehicle 10 on the road or the vehicle 10 is not allowed to travel, that is, the vehicle should stop. Note that the drive support system 1 shown in FIG. 1 shows the case where the traffic signals 12 and 12a are arranged at intersections; however, locations at which the traffic signals 12 and 12a are arranged are not limited to intersections. The traffic signals 12 and 12a may be, for example, arranged at pedestrian crossings.

Each of the infrastructure information transmission devices 14 transmits infrastructure information, such as road information of a road on which the vehicle 10 travels and signal information related to the traffic signal 12 or 12a ahead of the vehicle 10 in the travelling direction of the vehicle. The infrastructure information transmission device 14 according to the present embodiment is arranged at each intersection, and transmits the infrastructure information by wireless communication to the vehicles 10 that travel within a set range around the infrastructure information transmission device 14. Here, the road information typically includes speed limit information of a road on which the vehicle 10 travels, stop line information of an intersection, and the like. The signal information typically includes signal cycle information, such as the lighting cycle and signal change timing of the green light, yellow light and red light of each traffic signal 12 or 12a. Note that the infrastructure information transmission device 14 may be provided at each traffic signal 12 or 12a or may be provided one for a plurality of intersections.

The GPS satellites 16 each are a satellite that outputs a GPS signal required to carry out position detection by a global positioning system (GPS). FIG. 1 shows only one GPS satellite 16 in the drive support system 1; however, the drive support system 1 includes at least three GPS satellites 16. A device that detects a location by the GPS receives GPS signals output from the at least three GPS satellites 16, compares the received GPS signals with one another, and then detects the location of a host machine.

Next, the vehicle 10 equipped with the drive support device 19 will be described with reference to FIG. 2. Note that all the vehicles included in the drive support system shown in FIG. 1 are configured as the vehicles 10 equipped with the drive support device 19; instead, it is applicable that at least one of the vehicles 10 is equipped with the drive support device 19. That is, the drive support system 1 allows a situation that a vehicle that is not equipped with the drive support device 19 travels ahead of or behind the vehicle 10 equipped with the drive support device 19.

The vehicle 10 includes an ECU 20, a storage unit 22, an accelerator actuator 24, a brake actuator 26, a car navigation system 28, a speaker 30, a GPS communication unit 32, an on-board camera 34, a millimeter-wave radar 36, an infrastructure communication unit 38, a vehicle speed sensor 40, an indicating device 42, an ACC (adaptive cruise control) switch 44 and a PCS (pre-crash safety or pre-collision system) switch 46. Note that the ECU 20, storage unit 22, accelerator actuator 24, brake actuator 26, car navigation system 28, speaker 30, GPS communication unit 32, on-board camera 34, millimeter-wave radar 36, infrastructure communication unit 38, vehicle speed sensor 40, indicating device 42, ACC switch 44 and PCS switch 46 of the vehicle 10 also serve as the drive support device 19 of the vehicle 10. In addition, the vehicle 10 not only includes the above-described components but also includes components generally provided in a vehicle, such as a vehicle body, a driving source, a brake device and operating units (for example, a steering wheel, an accelerator pedal and a brake pedal).

The ECU 20 is an electronic control unit. The ECU 20 controls various components of the vehicle 10, the accelerator actuator 24, the brake actuator 26, the car navigation system 28, the speaker 30, the GPS communication unit 32, the on-board camera 34, the millimeter-wave radar 36, the infrastructure communication unit 38, the vehicle speed sensor 40, the indicating device 42, and the like. The ECU 20 controls operations of various components on the basis of pieces of information acquired from the GPS communication unit 32, the on-board camera 34, the millimeter-wave radar 36, the infrastructure communication unit 38 and the vehicle speed sensor 40 and operations of a driver, or the like, input from the ACC switch 44, the PCS switch 46 and the various operating units, such as the accelerator pedal and the brake pedal (not shown). In addition, the ECU 20 includes an inter-vehicle distance control unit 20a, a vehicle protection control unit 20b and a target vehicle speed control unit 20c.

The storage unit 22 is a storage device, such as a memory, and stores conditions and data required in various processes executed in the ECU 20 and various programs executed by the ECU 20. In addition, the storage unit 22 stores a map information database 22a. The map information database 22a stores information (such as a map, a straight road, a curve, an uphill/downhill, an expressway, a sag and a tunnel) required for a vehicle to travel. In addition, the map information database 22a includes a map data file, an intersection data file, a node data file and a road data file. The ECU 20 consults the map information database 22a and loads required information.

The accelerator actuator 24 controls an output of a power source, such as an engine and a motor, of the vehicle 10. The accelerator actuator 24 is able to control, for example, an intake air mass, intake timing and ignition timing of the engine, a voltage value and frequency supplied to the motor, or the like. The accelerator actuator 24 is electrically connected to the ECU 20. The operation of the accelerator actuator 24 is controlled by the ECU 20. The ECU 20 actuates the accelerator actuator 24 in accordance with an accelerator control signal to adjust the intake air flow rate, intake timing and ignition timing of the engine or the voltage value and frequency supplied to the motor. In other words, the accelerator actuator 24 is a device that is used to automatically control driving force generated by the power source. The accelerator actuator 24 drives the various components upon receiving the accelerator control signal output from the ECU 20 to control driving conditions and generate desired driving force. In this way, the accelerator actuator 24 adjusts an acceleration by controlling driving force applied to the vehicle 10.

The brake actuator 26 controls the brake device mounted on the vehicle 10. The brake actuator 26, for example, controls the hydraulic pressure of a wheel cylinder of the brake device. The brake actuator 26 is electrically connected to the ECU 20. The operation of the brake actuator 26 is controlled by the ECU 20. The ECU 20 actuates the brake actuator 26 in accordance with a brake control signal to adjust the brake hydraulic pressure of the wheel cylinder. In other words, the brake actuator 26 is a device that is used to automatically control braking force generated by a brake. The brake, actuator 26 drives a solenoid, motor, or the like, of a mechanism that supplies hydraulic fluid to the wheel cylinder upon receiving the brake control signal output from the ECU 20 to control brake hydraulic pressure and generate desired braking force. In this way, the brake actuator 26 adjusts a deceleration by controlling braking force applied to the vehicle 10.

The car navigation system 28 is a system that guides the vehicle 10 to a predetermined destination. The car navigation system 28 is able to bidirectionally communicate with the ECU 20. The car navigation system 28 includes a display unit, and displays surrounding map information on the display unit on the basis of information stored in the map information database 22a and information about a current location acquired by the GPS communication unit 32 (described later). In addition, the car navigation system 28 detects a route to the destination from the information stored in the map information database 22a, the information about the current location, acquired by the GPS communication unit 32 (described later), and information about the destination, input by the driver, or the like, and displays the detected route information on the display unit. Note that the car navigation system 28 may include a map information database and a GPS communication unit in itself, other than the map information database 22a and the GPS communication unit 32, and may carry out route guidance or provide notification about current location information with the use of the various units in itself.

The speaker 30 outputs voice into the cabin of the vehicle 10. The speaker 30 outputs voice, corresponding to an audio signal transmitted from the ECU 20, into the cabin.

The GPS communication unit 32 receives GPS signals respectively output from the plurality of GPS satellites 16. The GPS communication unit 32 transfers the received GPS signals to the ECU 20. The ECU 20 analyzes the received GPS signals to detect its own positional information.

The on-board camera 34 is an image capturing device arranged at the front of the vehicle 10, and acquires an image ahead (forward in a travelling direction) of the vehicle 10. The on-board camera 34 transfers the acquired image ahead of the vehicle 10 to the ECU 20. The ECU 20 analyzes the image acquired by the on-board camera 34 to make it possible to acquire a state ahead of the vehicle 10, that is, information, such as where there is another vehicle 10 ahead, whether the traffic signal 12 or 12a is close to the host vehicle and whether an intersection is close to the host vehicle.

The millimeter-wave radar 36 is a sensor that measures an inter-vehicle distance between the host vehicle and a preceding vehicle (vehicle ahead of the vehicle 10). The millimeter-wave radar 36 irradiates a radio wave in a millimeter wave band forward of the vehicle 10, and receives a radio wave that is reflected and returned from an object (preceding vehicle) to the millimeter-wave radar 36 within the irradiated radio wave. The millimeter-wave radar 36 compares an output condition of the irradiated radio wave with a detected result of the received radio wave to calculate a distance to the preceding vehicle. In addition, the millimeter-wave radar 36 may detect a distance to an obstacle ahead of the host vehicle. The millimeter-wave radar 36 transmits, to the ECU 20, information about the calculated distance to the preceding vehicle. Note that, in the present embodiment, the millimeter-wave radar 36 is used as a sensor that measures an inter-vehicle distance between the host vehicle and a preceding vehicle (a vehicle ahead of the vehicle 10); instead, various sensors that are able to measure a distance to an object ahead of the vehicle 10 may be used. For example, the vehicle 10 and the drive support device 19 may use a laser radar sensor instead of the millimeter-wave radar 36.

The infrastructure communication unit 38 communicates with the above described infrastructure information transmission device 14 in a wireless manner. The infrastructure communication unit 38 acquires infrastructure information transmitted from the infrastructure information transmission device 14, and transmits the acquired infrastructure information to the ECU 20. The infrastructure communication unit 38 may constantly communicate with the communicable infrastructure information transmission device 14 to acquire infrastructure information, may communicate with the infrastructure information transmission device 14 at set time intervals to acquire infrastructure information or, when the infrastructure communication unit 38 becomes communicable with a new infrastructure information transmission device 14, may communicate with that infrastructure information transmission device 14 to acquire infrastructure information.

The vehicle speed sensor 40 detects a vehicle speed of the vehicle 10. The vehicle speed sensor 40 transmits information about the acquired vehicle speed to the ECU 20.

The indicating device 42 displays various pieces of information to be provided to the driver, and is, for example, an instrument panel arranged at a dashboard of the vehicle 10. The indicating device 42 may be a liquid crystal indicating device or may be an indicating device in which various meters are arranged. The indicating device 42 indicates information about a remaining level of fuel, an output of the driving source (engine rotational speed), an open/close state of a door and a state of seatbelt use. The indicating device 42 includes a speed indication region 48 that indicates a vehicle speed.

As shown in FIG. 3, the speed indication region 48 has a scale indicating portion 50 and a needle 52. The scale indicating portion 50 is a circular arc shape, and has a scale of 0 km/h to 160 km/h. The needle 52 points a vehicle speed as a result of measurement, and indicates 40 km/h in FIG. 3. The speed indication region 48 is an analog meter, and is configured such that a position in the scale indicating portion 50, pointed by the needle 52, varies with a current vehicle speed. By so doing, the driver is able to recognize the detected result of the current vehicle speed by checking the position of the needle 52 in the speed indication region 48.

Next, the target vehicle speed control unit 20c will be described. The target vehicle speed control unit 20c calculates a reference target vehicle speed range on the basis of information acquired by the various components of the vehicle 10, determines a target vehicle speed range (target speed range) by processing the calculated reference target vehicle speed range on the basis of a set reference, and indicates the determined target vehicle speed range in the speed indication region 48 of the indicating device 42. Specifically, the target vehicle speed control unit 20c calculates a travel speed range (reference target vehicle speed range) required to pass through an intersection or pedestrian crossing while the traffic signal 12 or 12a is in a green light (that is, while the traffic signal is in a passage allowing indication state) on the basis of signal cycle information, such as a lighting cycle or signal change timing of the traffic signal 12 or 12a arranged at the intersection or pedestrian crossing to be passed, acquired by the infrastructure communication unit 38, and information, such as a distance between the vehicle 10 and the traffic signal 12 or 12a (accurately, a distance between the vehicle. 10 and the intersection or pedestrian crossing (region to be passed, traffic signal point) at which the traffic signal 12 or 12a is arranged). In addition, the target vehicle speed control unit 20c compares the calculated reference target vehicle speed range with a current vehicle speed, determines a target vehicle speed range on the basis of the comparison result, and indicates the calculated target vehicle speed range (recommended travel speed range) in the speed indication region 48. The target vehicle speed control unit 20c carries out green wave support in this way. The green wave support is to guide the driver to a vehicle speed such that it is possible to further reduce the number of times that the vehicle 10 stops at a red light. Note that the situation that the traffic signal is in a passage allowing indication state is a state where the traffic signal is indicating that passage of an intended way is allowed, and is not limited to a situation that the traffic signal is indicating a green light but it includes a state where the traffic signal is lighting an arrow lamp device. In addition, a state where the traffic signal is indicating a yellow light may also be set as a situation that the traffic signal is in a passage allowing indication state.

Figure 4:
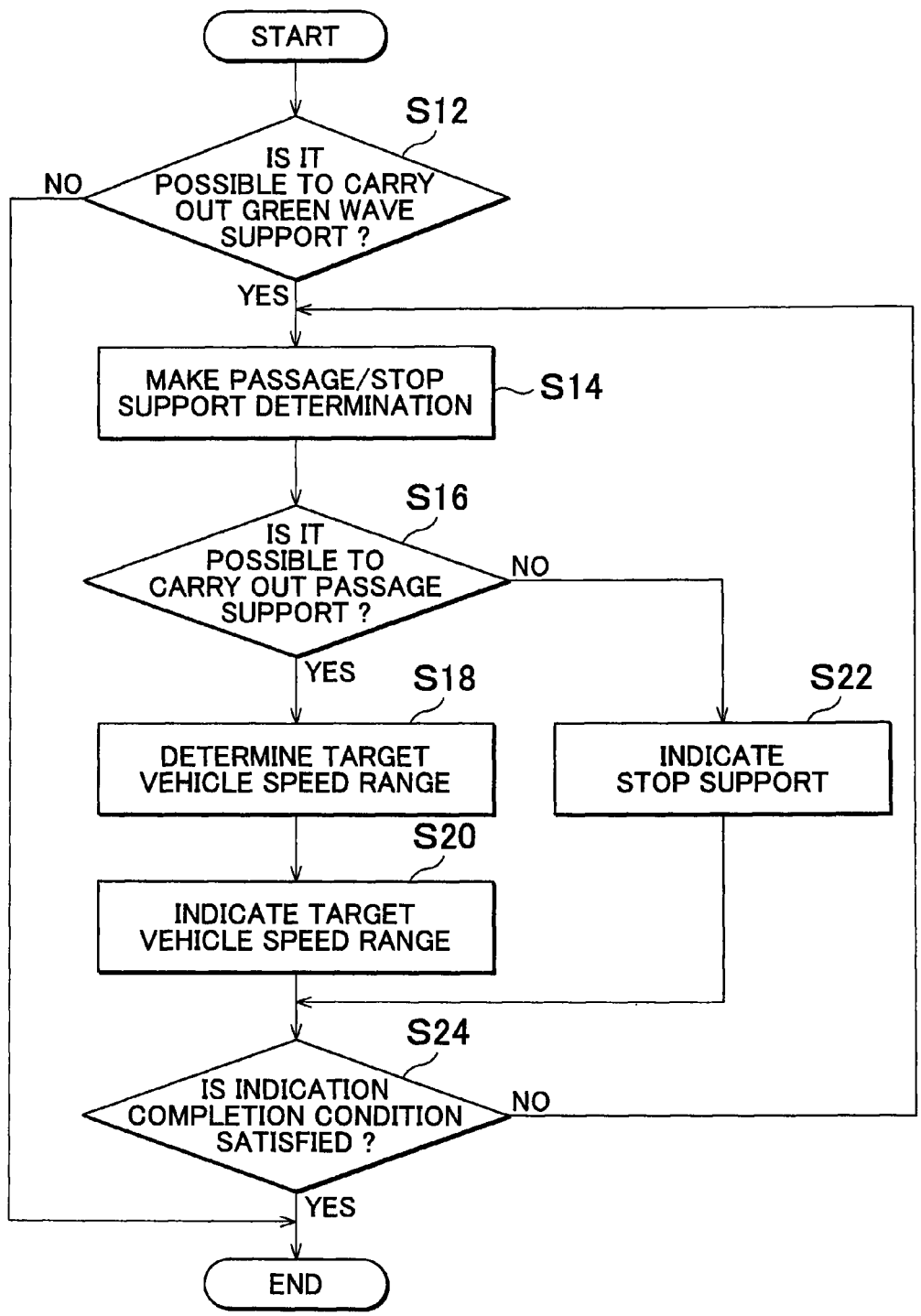
FIG. 4 is a flowchart that shows an example of processes of the drive support device.
Figure 5:
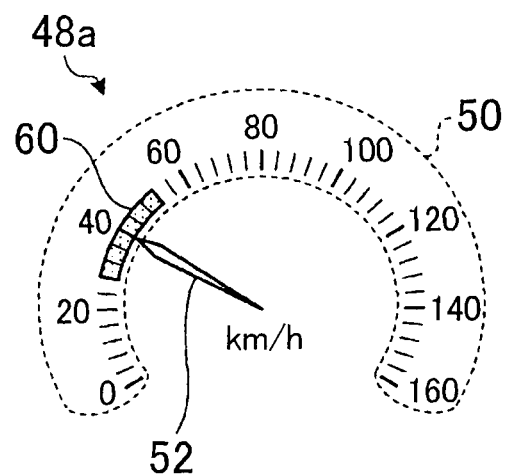
FIG. 5 is a schematic view that shows an example of the speed indication region of the indicating device.
Figure 6:
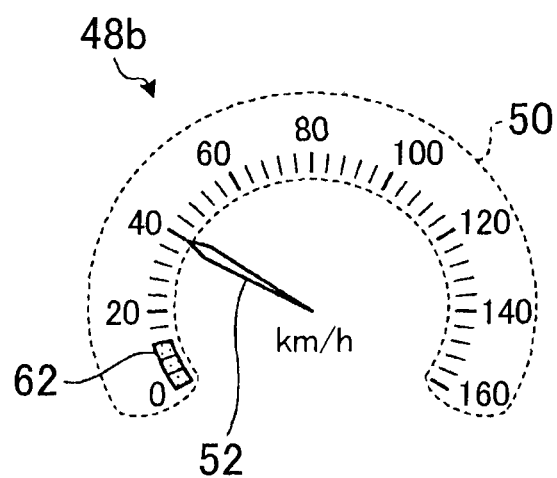
FIG. 6 is a schematic view that shows an example of the speed indication region of the indicating device.

Hereinafter, control executed by the target vehicle speed control unit 20c of the ECU 20 of the vehicle 10 will be described in more detail with reference to FIG. 4 to FIG. 6. FIG. 4 is a flowchart that shows an example of processes of the drive support device. FIG. 5 and FIG. 6 are schematic views that respectively show examples of the speed indication region of the indicating device.

The target vehicle speed control unit 20c of the ECU 20 determines in step S12 whether it is possible to carry out green wave support. Specifically, the target vehicle speed control unit 20c determines whether information required to calculate a target vehicle speed range has been acquired and a condition that it is allowed to indicate a target vehicle speed range is satisfied. Note that the information required to calculate a target vehicle speed range includes infrastructure information and map information. The infrastructure information is a lighting cycle, signal change timing, or the like, of the above-described traffic signal 12 or 12a to be passed. The map information includes information about a current location required to calculate a distance between the vehicle 10 and the traffic signal 12 or 12a and positional information of the traffic signal 12 or 12a. In addition, the condition that it is allowed to indicate a target vehicle speed range is a condition that the distance between the vehicle 10 and the traffic signal 12 or 12a (distance to an intended intersection, or the like) is longer than or equal to a set distance, a condition that the current vehicle speed of the vehicle 10 is higher than or equal to a set speed, or the like. When the distance between the vehicle 10 and the traffic signal 12 or 12a (distance to an intended intersection, or the like) is shorter than the set distance, it is difficult for the driver to perform driving operation in correspondence with an indicated target vehicle speed range, so the target vehicle speed control unit 20c determines not to carry out green wave support. In addition, when the current vehicle speed of the vehicle 10 is lower than the set speed, there is a possibility that, for example, a travel speed is limited due to traffic congestion of a travelling road or the vehicle 10 is about to stop or is stopped due to some reason, and it is difficult for the driver to perform driving operation in correspondence with an indicated target vehicle speed range, so the target vehicle speed control unit 20c determines not to carry out green wave support. When the target vehicle speed control unit 20c determines in step S12 that it is not supportable (No), that is, it is not possible to support driving operation, the target vehicle speed control unit 20c ends the process.

In addition, when the target vehicle speed control unit 20c determines in step S12 that it is supportable (Yes), the target vehicle speed control unit 20c makes a passage/stop support determination in step S14. That is, in step S14, the target vehicle speed control unit 20c calculates a reference target vehicle speed range on the basis of the acquired information, and determines whether to carry out passage support or stop support from the calculated reference target vehicle speed range. Here, the reference target vehicle speed range is a vehicle speed range in which it is possible to pass through an intended intersection, pedestrian crossing, or the like, that is, a vehicle speed range in which it is possible to pass through an intended intersection, pedestrian crossing, or the like, while an intended traffic signal is on a green light. In addition, the target vehicle speed control unit 20c according to the present embodiment determines to carry out stop support when the lower limit of the calculated reference target vehicle speed range is a speed higher by a speed a than a current vehicle speed, that is, when (current vehicle speed+α)<(lower limit speed of the reference target vehicle speed range).

After the target vehicle speed control unit 20c makes a determination in step S14, the target vehicle speed control unit 20c determines in step S16 whether it is possible to carry out passage support, that is, whether passage support is determined in step S14. When the target vehicle, speed control unit 20c determines in step S16 that it is possible to carry out passage support (Yes), that is, when passage support is determined in step S14, the target vehicle speed control unit 20c determines a target vehicle speed range in step S18. That is, the target vehicle speed control unit 20c adjusts a target vehicle speed range to be indicated in the speed indication region 48 on the basis of the reference target vehicle speed range calculated in step S14, the current vehicle speed and a preset condition. Here, the target vehicle speed control unit 20c according to the present embodiment sets the upper limit value (indication upper limit speed) of the target vehicle speed range to a speed lower than or equal to the current vehicle speed+α.

When the target vehicle speed control unit 20c determines the target vehicle speed range in step S18, the target vehicle speed control unit 20c indicates passage support information in step S20. The target vehicle speed control unit 20c indicates the determined target vehicle speed range in the speed indication region 48 as the passage support information. For example, the target vehicle speed control unit 20c indicates the speed indication region 48a shown in FIG. 5. The speed indication region 48a shows a mark 60 in a speed range that overlaps with the target vehicle speed range in the scale indicating portion 50. Here, in the present embodiment, because the target vehicle speed range is from 30 km/h to 50 km/h, the speed indication region 48a shows the mark 60 in a speed range from 30 km/h to 50 km/h. Note that, when the scale indicating portion 50 is displayed by image on a liquid crystal display device, the speed indication region 48a just needs to be superimposed on the image of the mark 60 as an image displayed on the liquid crystal display device. In addition, when the scale indicating portion 50 is drawn by ink, or the like, the speed indication region 48a may indicate the mark 60 such that a light-emitting unit is arranged at a scale of the scale indicating portion 50 and the light emitting unit of the target vehicle speed range is turned on. In this way, the target vehicle speed control unit 20c indicates the determined target vehicle speed range such that the target vehicle speed range is superimposed on the scale indicating portion 50 as the mark 60 to thereby make it possible for a user to recognize the determined target vehicle speed range. Here, when part of the reference target vehicle speed range calculated in step S14 is higher than the current vehicle speed+α, the target vehicle speed control unit 20c sets the upper limit value of the target vehicle speed range to the current vehicle speed+α, and does not indicate a speed higher than the current vehicle speed+α. After the target vehicle speed control unit 20c executes the process shown in step S20, the target vehicle speed control unit 20c proceeds to step S24.

When the target vehicle speed control unit 20c determines in step S16 that it is not possible to carry out passage support (No), the target vehicle speed control unit 20c indicates stop support information in step S22. Here, the stop support information indicates a speed range around 0 km/h as the target vehicle speed range. For example, the target vehicle speed control unit 20c indicates' the speed indication region 48b shown in FIG. 6. The speed indication region 48b shows a mark 62 in a speed range that overlaps with the target vehicle speed range of the scale indicating portion 50. Here, in the stop support information, because the target vehicle speed range is a speed range around 0 km/h (speed range that includes 0 km/h, and, in the present embodiment, from 0 km/h to 10 km/h), so the speed indication region 48b shows the mark 62 in the speed range around 0 km/h. In this way, the target vehicle speed control unit 20c indicates the determined target vehicle speed range such that the target vehicle speed range is superimposed on the scale indicating portion 50 as the mark 62 to thereby make it possible for the user to recognize the determined target vehicle speed range. By so doing, in step S22, it is possible for the user to recognize that stopping the vehicle 10 is recommended. After the target vehicle speed control unit 20c executes the process shown in step S22, the target vehicle speed control unit 20c proceeds to step S24.

After the target vehicle speed control unit 20c executes the process of step S20 or the process of step S22, the target vehicle speed control unit 20c determines in step S24 whether an indication completion condition is satisfied. Here, the indication completion condition is a preset condition in which indication of the target vehicle speed range is completed. The indication completion condition is, for example, when a distance between the vehicle and an intersection (intended traffic signal) is shorter than or equal to a set distance, when the vehicle speed falls outside a set range, when a set period of time has elapsed from when the target vehicle speed range is indicated, or the like. When the target vehicle speed control unit 20c determines in step S24 that the condition is not satisfied (No), the target vehicle speed control unit 20c proceeds to step S14, and repeats the above described processes. That is, a target vehicle speed range is calculated again, and the target vehicle speed range is indicated again. When the target vehicle speed control unit 20c determines in step S24 that the condition is satisfied (Yes), the target vehicle speed control unit 20c ends the process.

The drive support device 19 (and the vehicle 10 having the drive support device 19, and the drive support system 1) processes the thus calculated reference target vehicle speed range on the basis of the upper limit value set on the basis of the current vehicle speed, and indicates the target vehicle speed range, which is set to be lower than or equal to the upper limit value, on the speed indication region 48. That is, the drive support device 19 does not indicate a speed higher than the upper limit value (indication upper limit speed) set on the basis of the current vehicle speed, as the target vehicle speed range to be indicated in the speed indication region 48. By so doing, the drive support device 19 is able to suppress indication of a target vehicle speed range that requires steep acceleration and is able to indicate a target vehicle speed range that is less likely to make the driver experience a feeling of strangeness or stress. In addition, the driver is able to drive the vehicle in the target vehicle speed range by acceleration and deceleration in an appropriate range, so the driver is able to drive the vehicle 10 in a suitable condition (in the present embodiment, reducing a stop at a red light) while keeping an easy driving state.

In addition, the drive support device 19 sets the current vehicle speed+α, that is, a speed higher by a set speed than the current vehicle speed, as the indication upper limit speed. By so doing, it is possible to suppress an increase in acceleration required to bring the vehicle speed into the target vehicle speed range. By so doing, the vehicle 10 and the drive support device 19 are able to indicate a target vehicle speed range that is less likely to make the driver experience a feeling of strangeness or stress.

In addition, when it is not possible to carry out passage support, specifically, when the reference target vehicle speed range is higher than the indication upper limit speed, the drive support device 19 indicates a target vehicle speed range for stop support. By so doing, it is possible to recommend the driver stop the vehicle. By so doing, when steep acceleration is required to pass through an intended traffic signal, the drive support device 19 does not recommend unreasonable driving operation but is able to recommend the driver stop the vehicle. By so doing, it is possible to reduce the possibility of making the driver experience a feeling of strangeness or stress.

Note that, in the present embodiment, when it is not possible to carry out passage support, specifically, when the reference target vehicle speed range is higher than the indication upper limit speed, the target vehicle speed range for stop support is indicated; however, it is not limited to this configuration. When it is not possible to carry out passage support, the drive support device 19 may be configured not to indicate a target vehicle speed range instead of the process of step S22.

The drive support device 19 sets the indication upper limit speed to the current vehicle speed+α, that is, a speed higher by a set speed than the current vehicle speed; however, it is not limited to this configuration. In addition, various references may be used for a reference speed by which it is determined whether it is possible to carry out passage support as in the case of the indication upper limit speed described below. Here, the drive support device 19 may set the indication upper limit speed to the current vehicle speed+G×t. Here, G denotes acceleration, and t denotes time. That is, the drive support device 19 may set the indication upper limit speed to the current vehicle speed+G×t, that is, a speed that is achieved by the acceleration G in t seconds. Here, t seconds may be a value that varies on the basis of a distance to a traffic signal and a current vehicle speed. For example, t may be increased when the distance to the traffic signal is long; whereas t may be reduced when the distance to the traffic signal is short.

Figure 7:
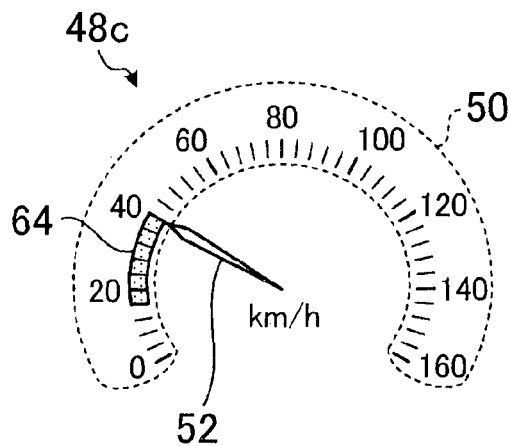
FIG. 7 is a schematic view that shows an example of the speed indication region of the indicating device.

In addition, the drive support device 19 according to the present embodiment may set the indication upper limit speed to the current vehicle speed. Here, FIG. 7 is a schematic view that shows an example of the speed indication region of the indicating device. The speed indication region 48c shown in FIG. 7 shows a mark 64 in a speed range that overlaps with the target vehicle speed range of the scale indicating portion 50. Here, because the speed indication region 48c shown in FIG. 7 sets the indication upper limit speed to the current vehicle speed, the upper limit of the target vehicle speed range is the current vehicle speed. In the speed indication region 48c, the current vehicle speed is 40 km/h as indicated by the needle 52, so the upper limit of the target vehicle speed range is 40 km/h. In addition, because the target vehicle speed range is from 20 km/h to 40 km/h, the speed indication region 48c indicates the mark 64 in a speed range from 20 km/h to 40 km/h. In this way, the target vehicle speed control unit 20c sets the indication upper limit speed to the current vehicle speed. By so doing, it is possible to set the target vehicle speed range to a speed that does not require acceleration. By so doing, the drive support device 19 does not recommend the driver a target vehicle speed range that requires acceleration, so it is possible to indicate a target vehicle speed range that is further less likely to make the driver experience a feeling of strangeness or stress.

In addition, the drive support devices 19 according to the above embodiment all use a current vehicle speed to determine an indication upper limit speed; however, it is not limited to this configuration. The drive support device 19 may determine an indication upper limit speed on the basis of a limit speed of a road (way) on which a vehicle is travelling. Here, the limit speed is, for example, a legal speed of a currently travelling road, and may be acquired from infrastructure information acquired by the infrastructure communication unit 38 or information about a current location that is detected from GPS signals received by the GPS communication unit 32 and that is stored in the map information database 22a. The drive support device 19 may use a combination of the infrastructure communication unit 38 or GPS communication unit 32 and the map information database 22a as an information acquisition unit that acquires information about a limit speed. The information acquisition unit that acquires information about a limit speed may be another function of the drive support device 19, such as the on-board camera 34. The drive support device 19 may acquire an image of a sign installed on a travelling road with the use of the on-board camera 34 and detect a legal speed, indicated in the image of the sign, as a limit speed. The drive support device 19 uses a limit speed as the indication upper limit speed. By so doing, it is possible to suppress a situation that the indicated target vehicle speed range exceeds the limit speed. By so doing, the drive support device 19 is able to indicate the target vehicle speed range at a speed lower than or equal to the limit speed, so it is possible to suppress indication of a speed at which the vehicle is not actually allowed to travel, and it is possible to indicate the target vehicle speed range that is further less likely to make the driver experience a feeling of strangeness or stress.

Note that it is more desirable that the drive support devices 19 according to the above embodiment use both a current vehicle speed and a limit speed to determine an indication upper limit speed. That is, when the drive support devices 19 use a current vehicle speed to determine an indication upper limit speed, it is desirable that a target vehicle speed range does not exceed a limit speed. By so doing, the drive support devices 19 are able to obtain both the above described advantageous effects and are able to indicate a target vehicle speed range that is less likely to make the driver experience a feeling of strangeness or stress.

The drive support device 19 desirably sets different colors between a mark that indicates a target vehicle speed range at the time of passage support and a mark that indicates a target vehicle speed range at the time of stop support. Note that not color but pattern, a lighting state, or the like, may be varied. By so doing, the driver is able to immediately recognize whether passage support information is indicated or stop support information is indicated.

Figure 8:
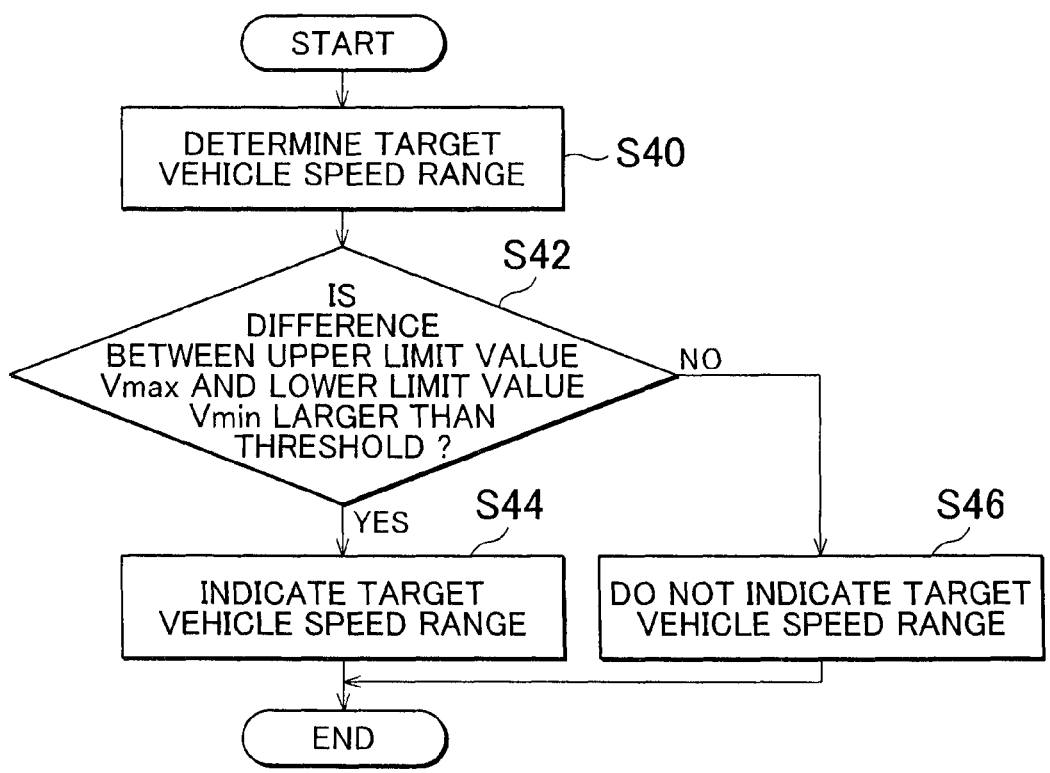
FIG. 8 is a flowchart that shows another example of processes of the drive support device.

Next, another example of the processes of the drive support device will be described with reference to FIG. 8. Here, FIG. 8 is a flowchart that shows another example of the processes of the drive support device. The processes shown in FIG. 8 are executed instead of the above described step S18 and step S20 shown in FIG. 4. That is, the processes shown in FIG. 8 are executed when affirmative determination is made in step S16 shown in FIG. 4. When the process ends, the process proceeds to step S24.

The target vehicle speed control unit 20c of the ECU 20 of the drive support device 19 determines a target vehicle speed range in step S40. That is, the target vehicle speed control unit 20c adjusts a target vehicle speed range to be indicated in the speed indication region 48 on the basis of a reference target vehicle speed range, a current vehicle speed and a preset condition as in the case of the above described step S16 in FIG. 4.

When the target vehicle speed control unit 20c determines the target vehicle speed range in step S18, the target vehicle speed control unit 20c determines in step S42 whether a difference between an upper limit value Vmax and lower limit value Vmin of the target vehicle speed range is larger than a threshold. When the target vehicle speed control unit 20c determines in step S42 that the difference between the upper limit value Vmax and the lower limit value Vmin is larger than the threshold (Yes), the target vehicle speed control unit 20c indicates the determined target vehicle speed range in the speed indication region in step S44. After the target vehicle speed control unit 20c executes the process of step S44, the process ends.

In addition, when the target vehicle speed control unit 20c determines in step S42 that the difference between the upper limit value Vmax and the lower limit value Vmin is not larger than the threshold (No), that is, when the difference between the upper limit value Vmax and the lower limit value Vmin is smaller than or equal to the threshold, the target vehicle speed control unit 20c does not indicate the determined target vehicle speed range, that is, does not indicate the target vehicle speed range in the speed indication region, in step S46. After the target vehicle speed control unit 20c executes the process of step S46, the process ends.

As shown in FIG. 8, when the difference in speed between the upper limit value Vmax and lower limit value Vmin of the determined target vehicle speed range is smaller than the threshold, the drive support device 19 does not indicate the target vehicle speed range to thereby make it possible not to indicate the target vehicle speed range in a condition that an allowable speed range is narrow and it is difficult to adjust the speed. By so doing, the drive support device 19 is able to selectively indicate a target vehicle speed range in a condition that an allowable speed range is wide and it is relatively easy to adjust the speed. By so doing, it is possible to indicate a target vehicle speed range that is less likely to make the driver experience a feeling of strangeness or stress.

Figure 9:
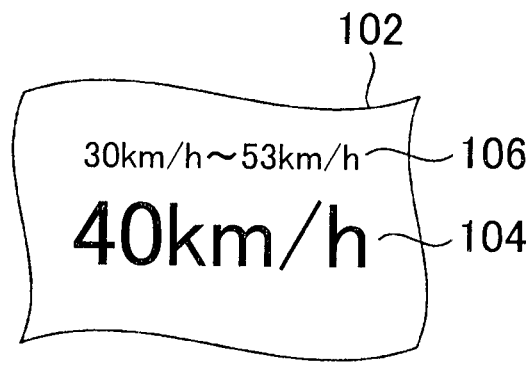
FIG. 9 is a schematic view that shows another example of a speed indication region of the indicating device.

In addition, the drive support device 19 according to the above embodiment uses an analog meter for indicating a speed in the speed indication region 48 of the indicating device 42; however, it is not limited to this configuration. The drive support device 19 according to the above embodiment may use a digital meter for indicating a speed in the speed indication region 48 of the indicating device 42. Here, FIG. 9 is a schematic view that shows another example of a speed indication region of the indicating device. The speed indication region 102 is an indication mechanism that indicates a speed in numeric character, and has a first region 104 and a second region 106. The first region 104 is a region that indicates a current vehicle speed. The first region 104 in FIG. 9 indicates "40 km/h". The second region 106 is a region at the upper side in the screen of the first region 104, and is a region that indicates a target vehicle speed range. The second region 106 shown in FIG. 9 indicates "30 km/h to 53 km/h". In this way, the drive support device 19 is able to obtain similar advantageous effects to those of the above embodiment even when the speed indication region 102 of the indicating device 42 is indicated by the digital meter. Here, it is desirable that the drive support device 19 indicates a current vehicle speed indicated in the first region 104 of the speed indication region 102 and a target vehicle speed range indicated in the second region 106 in at least one of different colors and different sizes. By so doing, the drive support device 19 is able to suppress a possibility that the driver confuses a current vehicle speed and a target vehicle speed range.

In addition, the drive support device 19 according to the above embodiment calculates a reference target vehicle speed range on the basis of a condition, in which it is possible to pass through an intersection or pedestrian crossing at which a traffic signal is arranged, based on information, or the like, of a signal cycle of the traffic signal; however, it is not limited to this configuration. The drive support device 19 may be used in various cases where a target vehicle speed range is indicated.

In addition, the drive support device 19 according to the above embodiment is configured to include the inter-vehicle distance control unit 20a and the vehicle protection control unit 20b; however, the drive support device 19 may not necessarily include both the inter-vehicle distance control unit 20a and the vehicle protection control unit 20b. In addition, the vehicle 10 and the drive support device 19 just need to be able to execute control with the use of the above described target vehicle speed control unit 20c.

The invention claimed is:

1. A drive support device that supports driving operation of a vehicle, comprising:
a vehicle speed sensor that detects a current vehicle speed of the vehicle; and
circuitry configured to:
calculate a reference target vehicle speed range of the vehicle,
set an indication upper limit speed on the basis of the current vehicle speed detected by the vehicle speed sensor,
determine a target vehicle speed range that is a speed range lower than or equal to the indication upper limit speed on the basis of the reference target vehicle speed range,
indicate the target vehicle speed range determined, and
when a difference in speed between an upper limit and lower limit of the reference target vehicle speed range is smaller than or equal to a predetermined value, not indicate the target vehicle speed range.

2. The drive support device according to claim 1, wherein when part of the calculated reference target vehicle speed range exceeds the indication upper limit speed, the circuitry is configured to set an upper limit value of the target vehicle speed range to the indication upper limit speed.

3. The drive support device according to claim 1, wherein when a whole of the reference target vehicle speed range exceeds the indication upper limit speed, the circuitry is configured to set the target vehicle speed range to a speed range including 0 km/h.

4. The drive support device according to claim 1, wherein the circuitry is configured to set the indication upper limit speed to a speed higher by a set speed than the current vehicle speed.

5. The drive support device according to claim 1, wherein the circuitry is configured to set the indication upper limit speed to the current vehicle speed.

6. The drive support device according to claim 1, wherein the circuitry is configured to:
  acquire a limit vehicle speed of a road on which the vehicle is travelling, and
  set the indication upper limit speed to a speed lower than or equal to the limit vehicle speed acquired.

7. The drive support device according to claim 1, wherein the circuitry is configured to:
  acquire information about a signal cycle that is a cycle at which indication of a traffic signal arranged in a travelling direction of the vehicle changes,
  calculate relative positional information between the vehicle and the traffic signal; and
  calculate a speed range, in which the vehicle is able to pass through a traffic signal point at which the traffic signal is arranged while the traffic signal is in a passage allowing indication state, as the reference target vehicle speed range on the basis of the calculated relative positional information between the vehicle and the traffic signal point and the information about the signal cycle acquired.

8. A drive support device that supports driving operation of a vehicle, comprising:
  circuitry configured to:
    acquire a limit vehicle speed of a road on which the vehicle is travelling;
    calculate a reference target vehicle speed range of the vehicle,
    set an indication upper limit speed on the basis of the limit vehicle speed acquired,
    determine a target vehicle speed range that is a speed range lower than or equal to the indication upper limit speed on the basis of the reference target vehicle speed range,
    indicate the target vehicle speed range determined, and
    when a difference in speed between an upper limit and lower limit of the reference target vehicle speed range is smaller than or equal to a predetermined value, not indicate the target vehicle speed range.

9. The drive support device according to claim 8, wherein the circuitry is configured to:
  acquire information about a signal cycle that is a cycle at which indication of a traffic signal arranged in a travelling direction of the vehicle changes,
  calculate relative positional information between the vehicle and the traffic signal, and
  calculate a speed range, in which the vehicle is able to pass through a traffic signal point at which the traffic signal is arranged while the traffic signal is in a passage allowing indication state, as the reference target vehicle speed range on the basis of the calculated relative positional information between the vehicle and the traffic signal point and the information about the signal cycle acquired.

10. A drive support method that supports driving operation of a vehicle, comprising:
  detecting a current vehicle speed of the vehicle;
  calculating a reference target vehicle speed range of the vehicle;
  setting an indication upper limit speed on the basis of the detected current vehicle speed;
  determining a target vehicle speed range that is a speed range lower than or equal to the indication upper limit speed on the basis of the reference target vehicle speed range;
  indicating the determined target vehicle speed range; and
  when a difference in speed between an upper limit and lower limit of the reference target vehicle speed range is smaller than or equal to a predetermined value, not indicating the target vehicle speed range.

11. The drive support method according to claim 10, wherein when part of the calculated reference target vehicle speed range exceeds the indication upper limit speed, an upper limit value of the target vehicle speed range is set to the indication upper limit speed.

12. The drive support method according to claim 10, wherein when a whole of the reference target vehicle speed range exceeds the indication upper limit speed, the target vehicle speed range is set to a speed range including 0 km/h.

13. The drive support method according to claim 10, wherein the indication upper limit speed is set to a speed higher by a set speed than the current vehicle speed.

14. The drive support method according to claim 10, wherein the indication upper limit speed is set to the current vehicle speed.

15. The drive support method according to claim 10, further comprising:
  acquiring a limit vehicle speed of a road on which the vehicle is travelling,
  wherein the indication upper limit speed is set to a speed lower than or equal to the acquired limit vehicle speed.

16. The drive support method according to claim 10, further comprising:
  acquiring information about a signal cycle that is a cycle at which indication of a traffic signal arranged in a travelling direction of the vehicle changes; and
  calculating relative positional information between the vehicle and the traffic signal, wherein a speed range, in which the vehicle is able to pass through a traffic signal point at which the traffic signal is arranged while the traffic signal is in a passage allowing indication state, is calculated as the reference target vehicle speed range on the basis of the calculated relative positional information between the vehicle and the traffic signal point and the acquired information about the signal cycle.

17. A drive support method that supports driving operation of a vehicle, comprising:
  acquiring a limit vehicle speed of a road on which the vehicle is travelling;
  calculating a reference target vehicle speed range of the vehicle;
  setting an indication upper limit speed on the basis of the acquired limit vehicle speed;
  determining a target vehicle speed range that is a speed range lower than or equal to the indication upper limit speed on the basis of the reference target vehicle speed range; and
  indicating the determined target vehicle speed range, wherein when a difference in speed between an upper limit and lower limit of the reference target vehicle speed range is smaller than or equal to a predetermined value, the target vehicle speed range is not indicated.

18. The drive support method according to claim 17, further comprising:

acquiring information about a signal cycle that is a cycle at which indication of a traffic signal arranged in a travelling direction of the vehicle changes; and calculating relative positional information between the vehicle and the traffic signal, wherein a speed range, in which the vehicle is able to pass through a traffic signal point at which the traffic signal is arranged while the traffic signal is in a passage allowing indication state, is calculated as the reference target vehicle speed range on the basis of the calculated relative positional information between the vehicle and the traffic signal point and the acquired information about the signal cycle.

* * * * *